US011703028B2

(12) United States Patent
Suhara et al.

(10) Patent No.: US 11,703,028 B2
(45) Date of Patent: Jul. 18, 2023

(54) HYDROELECTRIC POWER GENERATION SYSTEM

(71) Applicant: DAIKIN INDUSTRIES, LTD., Osaka (JP)

(72) Inventors: Atsushi Suhara, Osaka (JP); Takahiro Abe, Osaka (JP); Tomomi Sakamoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 127 days.

(21) Appl. No.: 17/482,247

(22) Filed: Sep. 22, 2021

(65) Prior Publication Data

US 2022/0010764 A1 Jan. 13, 2022

Related U.S. Application Data

(63) Continuation of application No. PCT/JP2020/012138, filed on Mar. 18, 2020.

(30) Foreign Application Priority Data

Mar. 28, 2019 (JP) .............................. JP2019-063941

(51) Int. Cl.
*F03B 15/16* (2006.01)
*F03B 15/12* (2006.01)

(52) U.S. Cl.
CPC .............. *F03B 15/16* (2013.01); *F03B 15/12* (2013.01); *F05B 2270/335* (2013.01); *F05B 2270/402* (2013.01); *F05B 2270/602* (2013.01)

(58) Field of Classification Search
CPC .... F03B 15/16; F03B 15/12; F05B 2270/335; F05B 2270/602
See application file for complete search history.

(56) References Cited

U.S. PATENT DOCUMENTS 4,754,156 A * 6/1988 Shiozaki ................ F03B 15/08
290/40 C
6,602,044 B1 * 8/2003 Kuwabara ............... F03B 3/10
415/36

(Continued)

FOREIGN PATENT DOCUMENTS

EP 3 336 344 A1 6/2018
JP 2004-360479 A 12/2004
JP 2014-214710 A 11/2014

OTHER PUBLICATIONS

International Preliminary Report of corresponding PCT Application No. PCT/JP2020/012138 dated Oct. 7, 2021.

(Continued)

*Primary Examiner* — Pedro J Cuevas
(74) *Attorney, Agent, or Firm* — Global IP Counselors, LLP (57) ABSTRACT

A hydroelectric power generation system includes a water turbine, a generator connected to the water turbine, and a controller. The water turbine is arranged in a flow path through which a fluid flows. The controller performs a pressure control by controlling the generator to regulate a pressure of the fluid downstream of the water turbine. The pressure control includes a first control regulating the pressure in parallel with a regenerative operation of the generator, and a second control regulating the pressure in parallel with a power running operation of the generator.

11 Claims, 11 Drawing Sheets

(56) References Cited

U.S. PATENT DOCUMENTS

| | | | | |
|---|---|---|---|---|
| 8,193,652 | B2* | 6/2012 | Paoli | F03B 3/103 |
| | | | | 290/43 |
| 9,243,604 | B2* | 1/2016 | Montgomery | F03B 13/00 |
| 9,869,292 | B2* | 1/2018 | Kang | F03B 15/16 |
| 10,233,895 | B2* | 3/2019 | Yeo | H02P 9/107 |
| 10,947,953 | B2* | 3/2021 | Burns | F03B 7/00 |
| 11,041,476 | B2* | 6/2021 | Abe | F03B 15/16 |
| 11,118,558 | B2* | 9/2021 | Abe | F03B 15/04 |
| 11,313,343 | B2* | 4/2022 | Abe | F03B 3/183 |
| 2010/0140935 | A1 | 6/2010 | Paoli | |
| 2012/0274066 | A1* | 11/2012 | Montgomery | F03B 13/00 |
| | | | | 415/220 |
| 2014/0265328 | A1* | 9/2014 | Van Blerk | F03B 11/004 |
| | | | | 290/43 |
| 2015/0260151 | A1* | 9/2015 | Kang | F03B 15/16 |
| | | | | 700/282 |
| 2018/0313324 | A1* | 11/2018 | Yeo | F03B 15/18 |
| 2019/0331086 | A1* | 10/2019 | Abe | F03B 15/16 |
| 2020/0386202 | A1* | 12/2020 | Abe | F03B 15/08 |
| 2022/0213864 | A1* | 7/2022 | Abe | F03B 15/08 |
| 2022/0213974 | A1* | 7/2022 | Heaney | F16K 31/08 |
| 2022/0235733 | A1* | 7/2022 | Harada | F03B 15/16 |
| 2022/0260084 | A1* | 8/2022 | Mariano | F04D 27/0269 |
| 2023/0088593 | A1* | 3/2023 | Batista Estévez | B05B 3/0431 |

OTHER PUBLICATIONS

International Search Report of corresponding PCT Application No. PCT/JP2020/012138 dated Jun. 16, 2020.
European Search Report of corresponding EP Application No. 20 77 8927.2 dated Oct. 4, 2022.

* cited by examiner

FIG.8A CONTROL ACCORDING TO PRESENT EMBODIMENT ($\Delta P \leq P_s$)

FIG.9A CONTROL ACCORDING TO PRESENT EMBODIMENT ($\Delta P \leq P_s$)

FIG.10A  CONTROL ACCORDING TO COMPARATIVE EXAMPLE

HYDROELECTRIC POWER GENERATION SYSTEM

CROSS-REFERENCE TO RELATED APPLICATIONS

This is a continuation of International Application No. PCT/JP2020/012138 filed on Mar. 18, 2020, which claims priority to Japanese Patent Application No. 2019-063941, filed on Mar. 28, 2019. The entire disclosures of these applications are incorporated by reference herein.

BACKGROUND

Field of Invention

The present disclosure relates to a hydroelectric power generation system.

Background Information

Japanese Unexamined Patent Publication No. 2014-214710 discloses a hydroelectric power generation system including a water turbine arranged in a flow path and a generator connected to the water turbine. A fluid flowing through the flow path rotates the water turbine. Rotation of the water turbine drives the generator. The driven generator generates power.

SUMMARY

A first aspect of the present disclosure is directed to a hydroelectric power generation system including a water turbine, a generator connected to the water turbine, and a controller. The water turbine is arranged in a flow path through which a fluid flows. The controller performs a pressure control by controlling the generator to regulate a pressure of the fluid downstream of the water turbine. The pressure control includes a first control regulating the pressure in parallel with a regenerative operation of the generator, and a second control regulating the pressure in parallel with a power running operation of the generator.

DETAILED DESCRIPTION OF EMBODIMENT(S)

An embodiment of the present disclosure will be described with reference to the drawings. The following embodiment is merely an exemplary one in nature, and is not intended to limit the scope, applications, or use of the invention.

Embodiment

Figure 1:
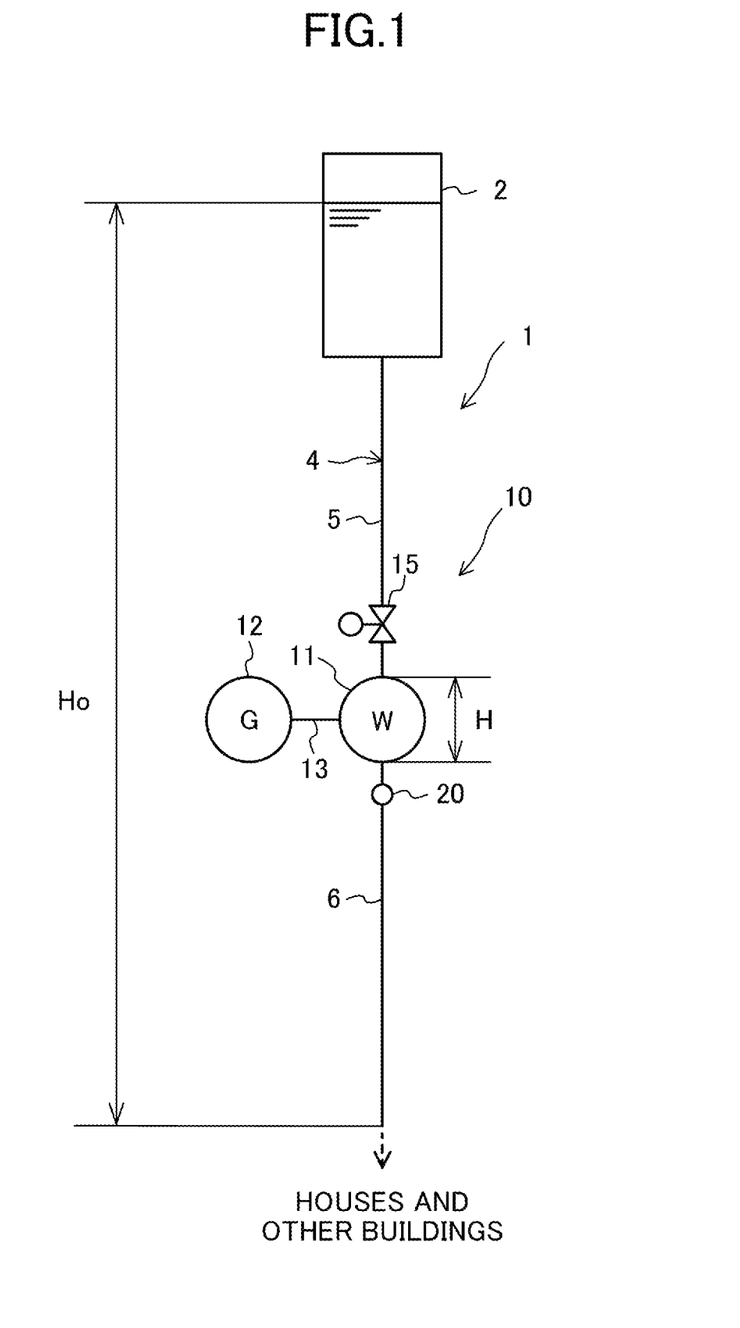
FIG. 1 is a schematic configuration diagram illustrating a hydroelectric power generation system and a water supply system according to an embodiment.

A hydroelectric power generation system (10) shown in FIG. 1 is applied to a water supply system (1). The hydroelectric power generation system (10) of the present embodiment is applied to a terminal side of the water supply system (1). Water (fluid) flowing through the hydroelectric power generation system (10) is supplied to houses and buildings.

Water Supply System

The water supply system (1) includes a water distribution tank (2) and a flow path (4). The flow path (4) constitutes a pipeline between the water distribution tank (2) and a water recipient such as a house. The flow path (4) is a channel through which water flows with a head.

The flow path (4) includes a first flow path (5) and a second flow path (6). The first flow path (5) is formed upstream of a water turbine (11). The first flow path (5) is formed between the water distribution tank (2) and the water turbine (11). The second flow path (6) is formed downstream of the water turbine (11). The second flow path (6) is formed between the water turbine (11) and the water recipient.

Hydroelectric Power Generation System

Figure 2:
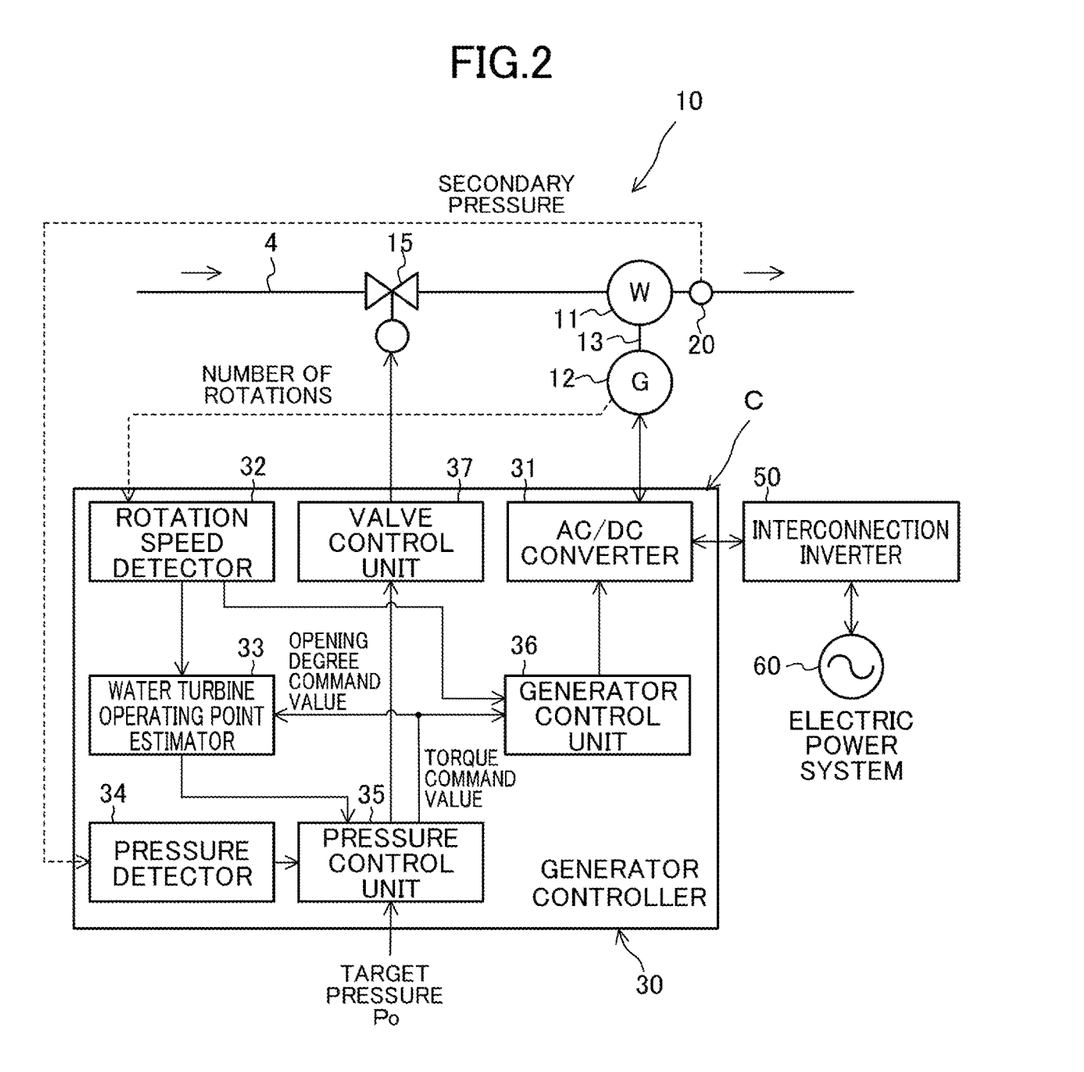
FIG. 2 is a configuration diagram illustrating the entire hydroelectric power generation system according to the embodiment.

As illustrated in FIGS. 1 and 2, the hydroelectric power generation system (10) includes a water turbine (11), a generator (12), a motor-operated valve (15), and a pressure sensor (20). As illustrated in FIG. 2, the hydroelectric power generation system (10) includes a generator controller (30) and an interconnection inverter (50).

Water Turbine

The water turbine (11) is arranged in the middle of the flow path (4). The water turbine (11) includes a casing and an impeller (not shown) housed in the casing. A rotary shaft (13) is fixed to the center of the impeller. Water flowing through the flow path (4) rotates the water turbine (11), thereby rotationally driving the rotary shaft (13).

Generator

The generator (12) is connected to the water turbine (11) through the rotary shaft (13). The generator (12) has a rotor and a stator (not shown). The rotor has embedded permanent magnets. The stator has a coil.

Rotation of the water turbine (11) drives the generator (12). Thus, the generator (12) operates in a regenerative mode. The generator (12) operating in a regenerative mode generates power. The power generated by the generator (12) is supplied to an electric power system (60) via a power circuit (C). The electric power system (60) is, for example, a commercial power source.

As will be described in detail later, the power circuit (C) is configured to be able to feed the power of the electric power system (60) to the generator (12). Receiving the power of the electric power system (60) through the power circuit (C), the generator (12) operates in a power running mode. The generator (12) operating in the power running mode functions as a motor for rotationally driving the water turbine (11). In the present embodiment, the water turbine (11) rotates in the same direction in the power running mode and the regenerative mode.

Motor-Operated Valve

The motor-operated valve (15) is arranged in series with the water turbine (11) in the flow path (4). The motor-operated valve (15) is arranged in the first flow path (5). The motor-operated valve (15) is a motor-driven pressure regulating valve. A motor regulates the opening degree of the motor-operated valve (15). The motor-operated valve (15) regulates an effective head (H) of the water turbine (11). The motor-operated valve (15) also regulates a secondary pressure (P2) which is a pressure downstream of the water turbine (11).

Pressure Sensor

The pressure sensor (20) is arranged in the second flow path (6). The pressure sensor (20) is a pressure detector that detects the secondary pressure (P2) downstream of the water turbine (11). The secondary pressure (P2) detected by the pressure sensor (20) is inputted to the generator controller (30).

Power Circuit

The power circuit (C) shown in FIG. 2 includes an AC/DC converter (31) and an interconnection inverter (50). The power circuit (C) is configured to supply power bidirectionally between the generator (12) and the electric power system.

The AC/DC converter (31) is provided in the generator controller (30). The AC/DC converter (31) includes a plurality of switching elements. The AC/DC converter (31) converts AC power generated by the generator (12) into DC power, and outputs the converted DC power to the interconnection inverter (50). The AC/DC converter (31) converts DC power outputted from the interconnection inverter (50) into AC power, and outputs the converted AC power to the generator (12). Thus, the AC/DC converter (31) is a bidirectional converter.

The interconnection inverter (50) has a plurality of switching elements constituting an inverter. The interconnection inverter (50) converts DC power outputted from the AC/DC converter (31) into AC power, and supplies the converted AC power to the electric power system (60). The interconnection inverter (50) converts AC power supplied from the electric power system into DC power, and outputs the converted DC power to the AC/DC converter (31). Thus, the interconnection inverter (50) has a bidirectional inverter.

Generator Controller

The generator controller (30) shown in FIG. 2 constitutes a controller that controls the generator (12) and the motor-operated valve (15). The generator controller (30) includes the AC/DC converter (31) described above, a rotation speed detector (32), a water turbine operating point estimator (33), a pressure detector (34), a pressure control unit (35), a generator control unit (36), and a valve control unit (37). The generator controller (30) includes a microcomputer and a memory device storing a program for operating the microcomputer.

The rotation speed detector (32) detects the number of rotations of the generator (12). The number of rotations detected by the rotation speed detector (32) is outputted to the water turbine operating point estimator (33) and the generator control unit (36). The water turbine operating point estimator (33) obtains a water turbine operating point based on the number of rotations of the generator (12) and a torque command value of the generator (12). The pressure detector (34) receives the secondary pressure (P2) detected by the pressure sensor (20).

The pressure control unit (35) generates a torque command value for the generator (12) based on a preset target pressure (Po) and the secondary pressure (P2). The torque command value corresponds to the torque of the generator (12) for converging the secondary pressure (P2) to the target pressure (Po). The pressure control unit (35) outputs the generated torque command value to the generator control unit (36).

The pressure control unit (35) further generates an opening degree command value for the motor-operated valve (15). The opening degree command value corresponds to the opening degree of the motor-operated valve (15) for converging the water turbine operating point to a normal operating region. The pressure control unit (35) outputs the generated opening degree command value to the valve control unit (37).

The generator control unit (36) controls the torque of the generator (12) so that the secondary pressure (P2) converges to the target pressure (Po). The generator control unit (36) receives the torque command value outputted from the pressure control unit (35) and the number of rotations outputted from the rotation speed detector (32). The generator control unit (36) calculates a voltage command value in accordance with the inputted torque command value and number of rotations. The generator control unit (36) controls the switching elements of the AC/DC converter (31) in accordance with the voltage command value. Thus, the torque of the generator (12) converges to the torque command value. The torque command value includes a negative torque command value that allows the generator (12) to operate in the regenerative mode and a positive torque command value that allows the generator (12) to operate in the power running mode.

The valve control unit (37) controls the opening degree of the motor-operated valve (15) so that the secondary pressure (P2) converges to the target pressure (Po). The valve control unit (37) receives the opening degree command value outputted from the pressure control unit (35). The valve control unit (37) outputs a predetermined control signal to the motor-operated valve (15) in accordance with the inputted opening degree command value. Thus, the opening degree of the motor-operated valve (15) converges to the opening degree command value.

Characteristics of Hydroelectric Power Generation System and Flow Path

The characteristics of the hydroelectric power generation system (10) and the flow path (4) will be described with reference to FIGS. 3 and 4.

Figure 3:
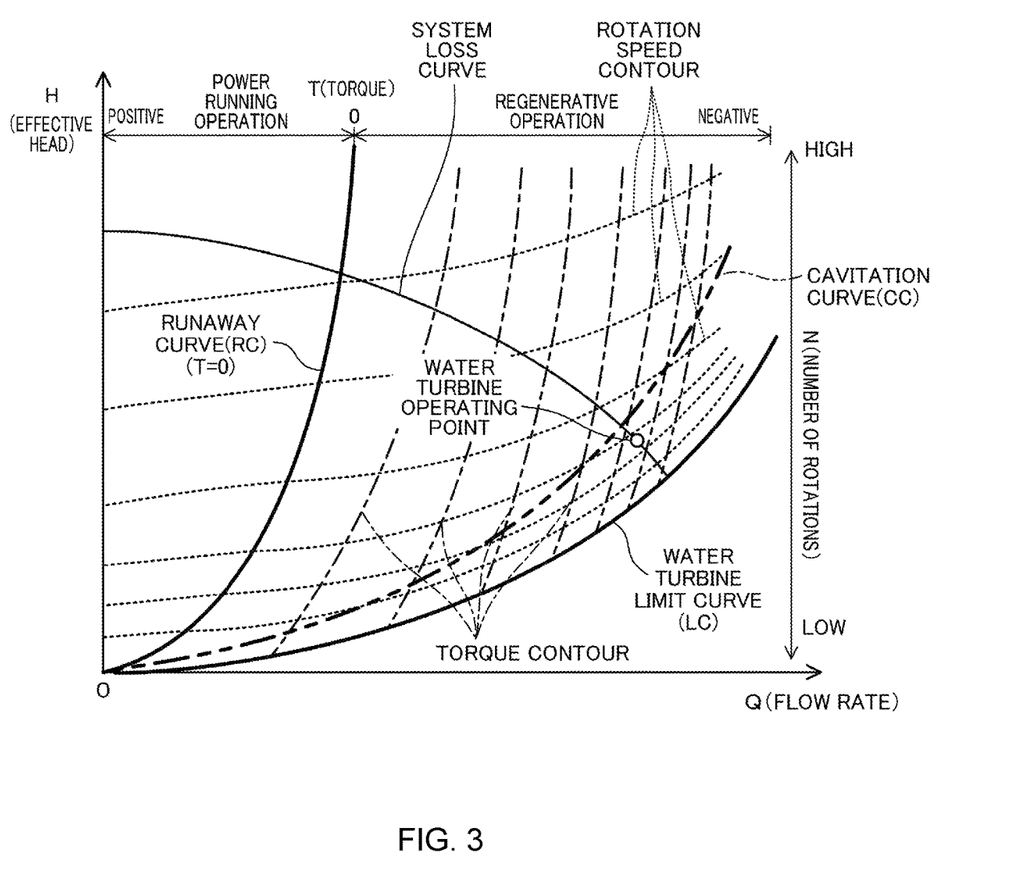
FIG. 3 is a graph showing a characteristic map of the hydroelectric power generation system.

FIG. 3 is a graph showing the characteristics of the water turbine, i.e., what is called a characteristic map. In FIG. 3, the vertical axis represents an effective head (H) of the water turbine (11), and the horizontal axis a flow rate (Q) of water flowing through the water turbine (11). The effective head (H) is a value obtained by subtracting a head corresponding to a flow path resistance, a pressure loss of the motor-operated valve (15), and the secondary pressure (P2) from a total head (Ho) shown in FIG. 1. The total head (Ho) is a difference in elevation from the surface of water in the water distribution tank (2) to the outlet end of the flow path (4). The flow path resistance corresponds to the resistance of a pipeline of the flow path (4).

The relationship between the effective head (H) of the water turbine (11) and the flow rate (Q) can be represented by a system loss curve (flow resistance characteristic curve) shown in FIG. 3. The system loss curve shows a characteristic that the effective head (H) decreases with the increase of the flow rate (Q). A point corresponding to the flow rate (Q) and the effective head (H) of the water turbine (11), i.e., the water turbine operating point, always moves on the system loss curve.

FIG. 3 shows torque contours and rotational speed contours. Each of the torque contours represents the torque (T) of the generator (12), and extends vertically. A curve on which the torque (T) is zero is referred to as a runaway curve (RC). Each of the rotational speed contours is a curve representing the number of rotations (N) of the water turbine (11), and extends in the left-right direction. A curve on which the number of rotations (N) is zero or a predetermined minimum value is referred to as a water turbine limit curve (LC).

A water turbine region lies between the runaway curve (RC) and the water turbine limit curve (LC). When the water turbine operating point is in the water turbine region, the generator (12) operates in the regenerative mode. The negative torque increases with the increase in distance in the right direction from the runaway curve (RC). The number of rotations (N) increases with the increase in distance in the upward direction from the water turbine limit curve (LC). Thus, the power generated by the generator (12) tends to increase with the decrease in distance from the upper right of FIG. 3.

A region on the left of the runaway curve (RC) is referred to as a water turbine brake region. When the water turbine operating point is in the water turbine brake region, the generator (12) operates in the power running mode. The positive torque increases with the increase in distance in the left direction from the runaway curve (RC).

FIG. 3 also shows a cavitation curve (CC). The cavitation curve (CC) is a curve positioned inward of the water turbine limit curve (LC) along the water turbine limit curve (LC). If the water turbine operating point is in a region between the runaway curve (RC) and the cavitation curve (CC), cavitation may occur in the water turbine (11). When the water turbine operating point is in a region between the cavitation curve (CC) and the water turbine limit curve (LC), i.e., in a normal operating region, no cavitation occurs, and a normal operation is allowed.

Figure 4:
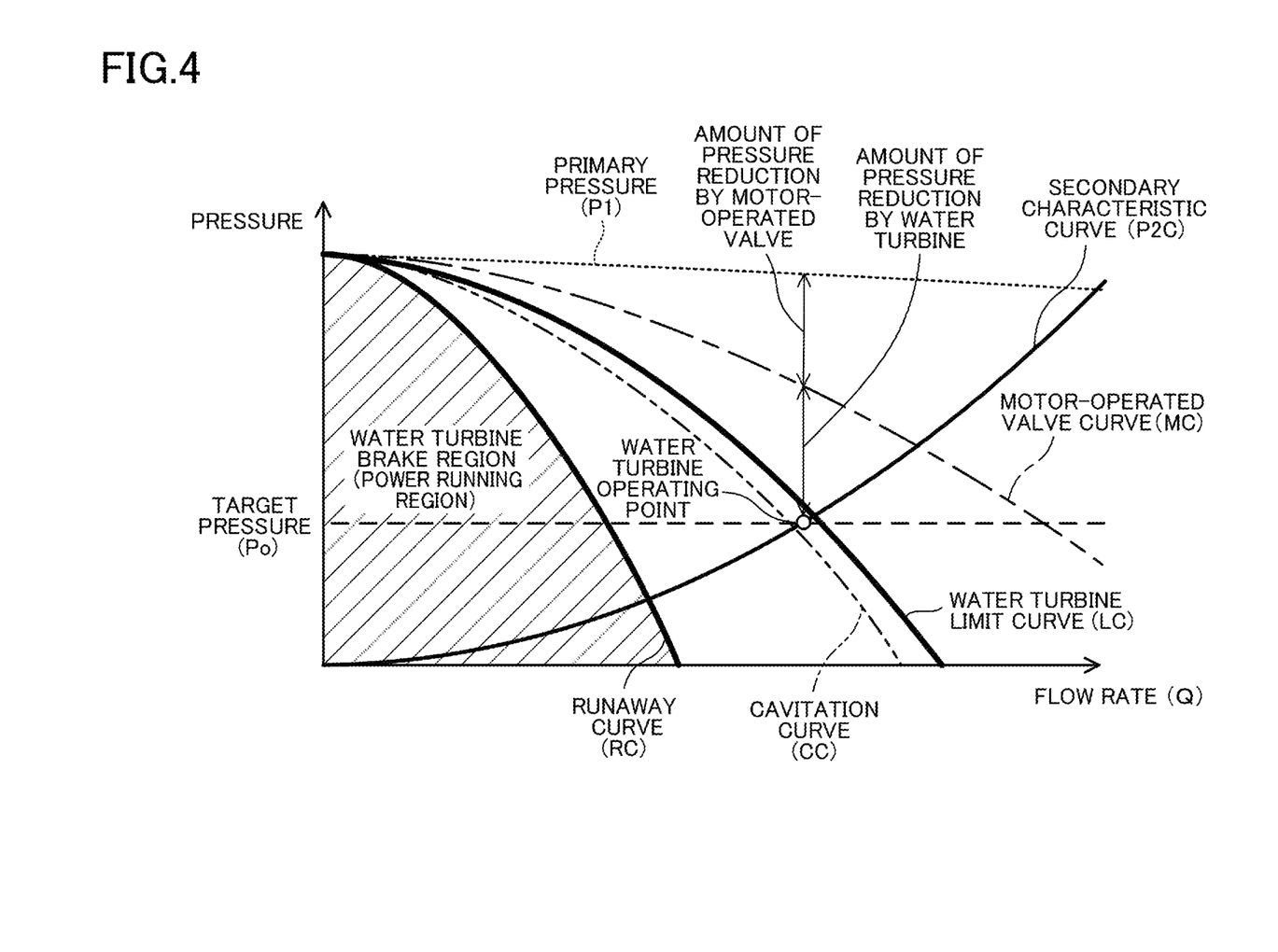
FIG. 4 is a graph showing the relationship between a flow rate and a pressure, together with characteristic curves of a primary pressure, a secondary pressure, and others.

FIG. 4 is a graph showing characteristics of the primary pressure (P1), the secondary pressure (P2), and the motor-operated valve (15) of the hydroelectric power generation system (10) of the present embodiment. In FIG. 4, the vertical axis represents a fluid pressure, and the horizontal axis the flow rate (Q) of the water turbine (11).

The primary pressure (P1) in FIG. 4 indicates a pressure upstream of the water turbine (11) and the motor-operated valve (15). A motor-operated valve curve (MC) shown in FIG. 4 represents the relationship between the pressure reduced by the motor-operated valve (15) at a predetermined opening degree and the flow rate (Q). Thus, for example, a difference between the primary pressure (P1) and the motor-operated valve curve (MC) at the flow rate (Q) corresponding to the water turbine operating point (a white dot shown in FIG. 4) is the amount of pressure reduction by the motor-operated valve (15). The motor-operated valve curve (MC) becomes less steep along the primary pressure (P1) with the increase in opening degree of the valve. The motor-operated valve curve (MC) becomes steeper along the runaway curve (RC) with the decrease in opening degree of the valve.

A secondary characteristic curve (P2C) represents the relationship between a pressure loss on the downstream side of the water turbine (11) and the flow rate. It can be said that the secondary characteristic curve (P2C) is a curve plotting the difference between the pressure on the motor-operated valve curve (MC) and the effective head (H) on the system loss curve at the same flow rate (Q). Thus, the water turbine operating point is always on the secondary characteristic curve (P2C). The secondary characteristic curve (P2C) becomes less steep and falls to the lower right as the flow rate (Q) increases. The secondary characteristic curve (P2C) becomes steeper and rises to the upper left as the flow rate (Q) decreases. At the flow rate (Q) corresponding to the water turbine operating point illustrated in FIG. 4, the difference between the motor-operated valve curve (MC) and the secondary characteristic curve (P2C) is the amount of pressure reduction by the water turbine (11).

FIG. 4 shows the runaway curve (RC), the water turbine limit curve (LC), and the cavitation curve (CC). A hatched region on the left of the runaway curve (RC) is the above-described water turbine brake region (power running region). A region between the water turbine limit curve (LC) and the cavitation curve (CC) is a normal operating region. In FIG. 4, the water turbine limit curve (LC) becomes less steep along the primary pressure (P1) as the opening degree of the motor-operated valve (15) increases. The water turbine limit curve (LC) becomes steeper along the runaway curve (RC) as the opening degree of the motor-operated valve (15) decreases. In FIG. 4, the runaway curve (RC) becomes less steep as the opening degree of the motor-operated valve (15) increases, and becomes steeper as the opening degree of the motor-operated valve (15) decreases.

The relationship between the parameters shown in FIGS. 3 and 4 is stored as data such as a table or a function in the memory device of the generator controller (30). Thus, the generator controller (30) can obtain various indices using this data.

Operation

The operation of the hydroelectric power generation system (10) will be described below.

Basic Operation

Basic operation of the hydroelectric power generation system (10) will be described with reference to FIGS. 1 and 2.

Water in the water distribution tank (2) flows through the flow path (4). The water in the flow path (4) passes through the motor-operated valve (15) and then flows through the water turbine (11). When the flow of water rotates the water turbine (11), the generator (12) generates power. The generator (12) in this state operates in the regenerative mode.

AC power generated by the generator (12) is converted into DC power by the AC/DC converter (31). The DC power converted by the AC/DC converter (31) is converted into AC power by the interconnection inverter (50) and supplied to the electric power system (60).

Problem of Pressure Control

In the flow path (4) to which the hydroelectric power generation system (10) is applied, the secondary pressure (P2) of the water turbine (11) needs to be kept at the target pressure (Po). However, the secondary pressure (P2) varies depending on the amount of water consumption downstream of the flow path (4). For example, at midnight, almost no water is consumed in houses and other buildings. Thus, the flow rate of water supplied to the houses and other buildings decreases. This may be accompanied by a sharp rise of the secondary pressure (P2). As a result, the secondary pressure (P2) cannot be maintained at the target pressure (Po), leaving a concern that the demand of the water supply system (1) cannot be satisfied.

The control for reducing the secondary pressure (P2) includes, as illustrated in FIG. 4, controlling the motor-operated valve (15) to regulate the amount of pressure reduction by the motor-operated valve (15) (control via the motor-operated valve) and controlling the generator (12) to regulate the amount of pressure reduction by the water turbine (11) (control via the generator).

The pressure regulation by means of the motor-operated valve (15) shows much lower responsiveness than the pressure regulation by means of the generator (12), and the secondary pressure (P2) cannot be reduced quickly. Specifically, the motor-operated valve (15), which is driven by a motor, has low responsiveness. Characteristically, the motor-operated valve (15) cannot show a sufficient amount of pressure reduction unless its opening degree is relatively small. This characteristic contributes to the low responsiveness of the pressure regulation by the motor-operated valve (15).

Figure 5:
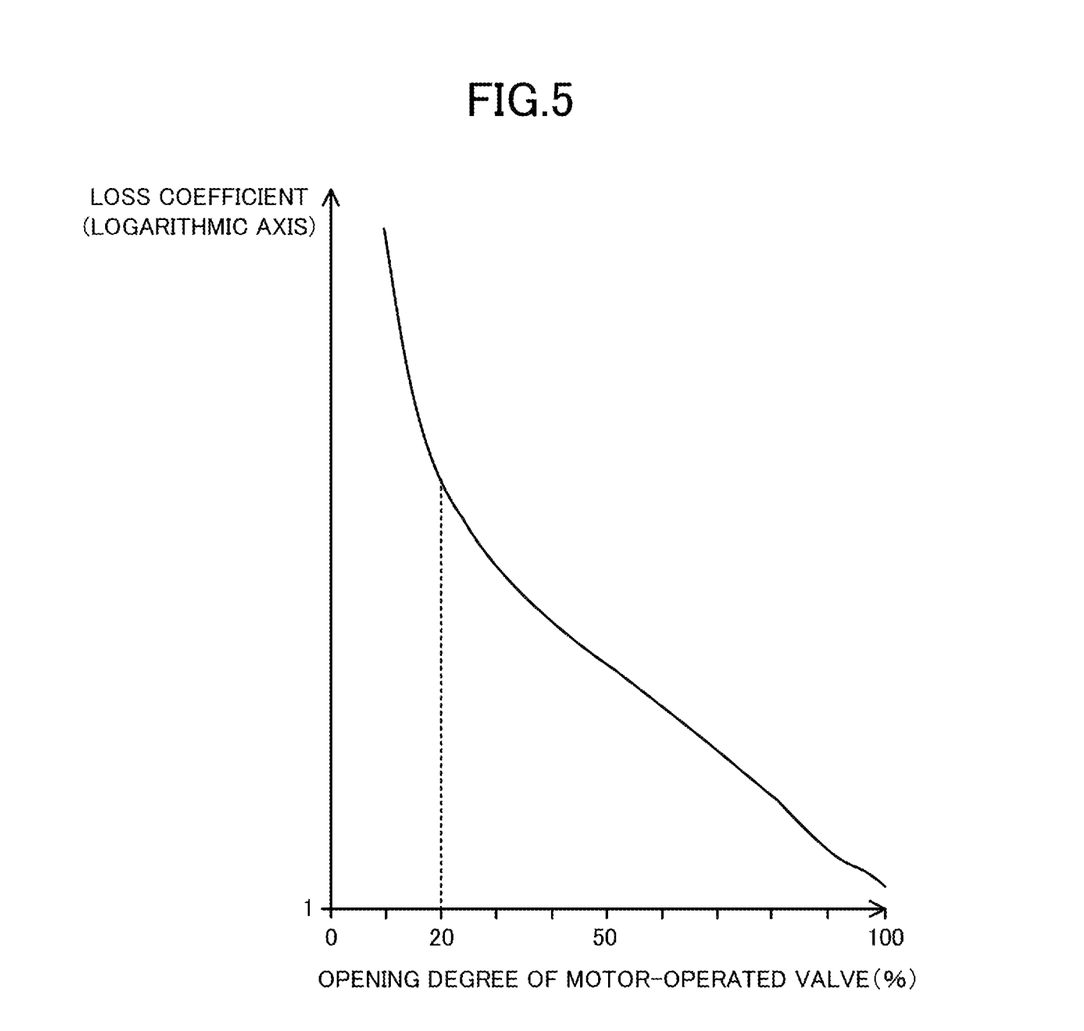
FIG. 5 is a graph showing the relationship between the opening degree of a motor-operated valve and a loss coefficient.

FIG. 5 is a graph showing an example of the relationship between the opening degree (%) of the motor-operated valve and the loss coefficient. The loss coefficient is an index indicating the amount of pressure reduction by the motor-operated valve. In the characteristic of the motor-operated valve shown in FIG. 5, the loss coefficient sharply rises when the opening degree of the motor-operated valve is about 20% or less. In other words, the motor-operated valve cannot show a sufficient amount of pressure reduction unless the opening degree is about 20% or less. Thus, the control via the motor-operated valve has a concern that the secondary pressure (P2), if rapidly increased, cannot quickly converge to the target pressure (Po).

The control via the generator has a disadvantage, i.e., the range of pressure regulation is limited. The pressure regulation by means of the generator (12) has much higher responsiveness than the pressure regulation by means of the motor-operated valve (15). Thus, when the generator (12) is operating in the regenerative mode, reducing the negative torque (to be closer to zero) can reduce the flow rate (Q), and in turn, the secondary pressure (P2). However, even if the torque (T) is reduced to zero in the regenerative operation, the secondary pressure (P2) may not reach the target pressure (Po).

Pressure control performed by combining the control via the generator and the control via the motor-operated valve has a similar disadvantage. This will be described in detail below with reference to a comparative example shown in FIGS. 10A to 10D. A hydroelectric power generation system of the comparative example has the same configuration as that of FIG. 1.

FIGS. 10A to 10D show graphs each corresponding to the graph of FIG. 4. FIGS. 10A to 10D show the primary pressure (P1), the motor-operated valve curve (MC), the secondary characteristic curve (P2C), the water turbine limit curve (LC), and the runaway curve (RC). The cavitation curve (CC), which is not shown, is positioned slightly inside the water turbine limit curve (LC) similarly to that shown in FIG. 4.

Figure 10A:
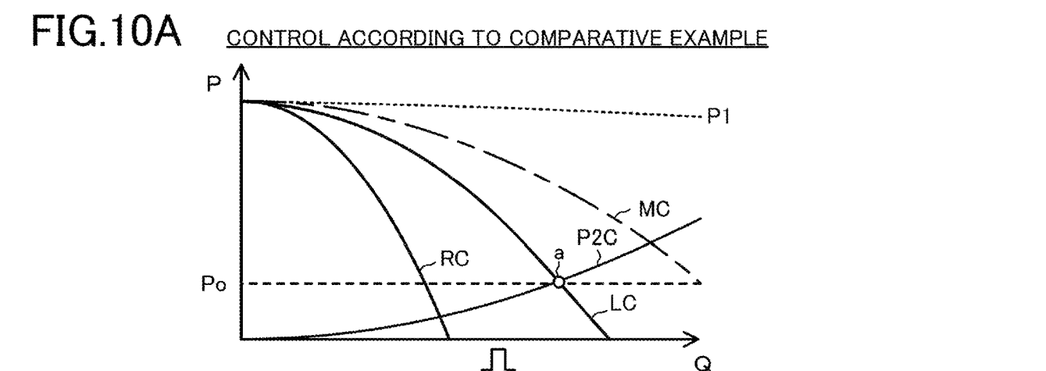
FIGS. 10A to 10D are graphs each showing a specific example of pressure control according to a comparative example.
Figure 10B:
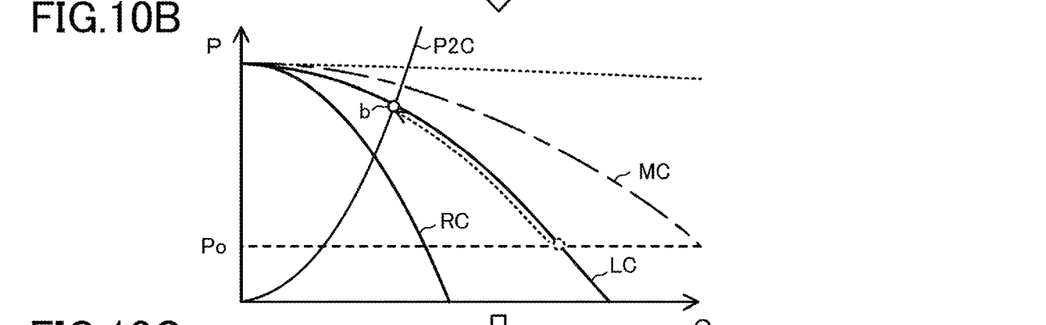
Figure 10C:
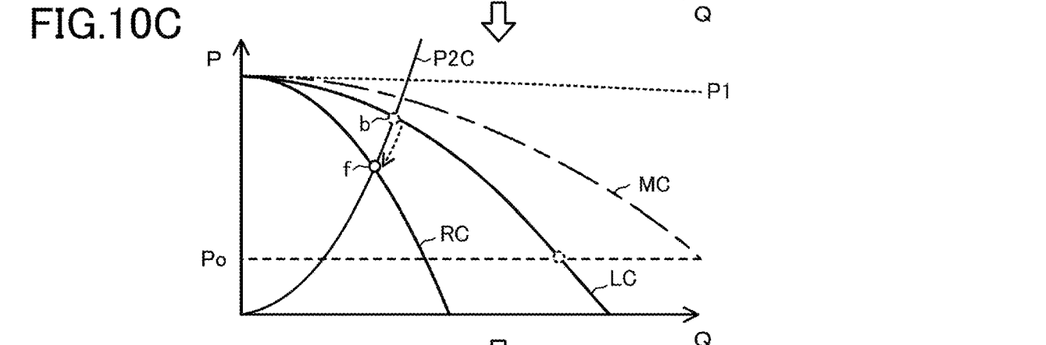

In the state shown in FIG. 10A, the water turbine operating point is at position a on the intersection between the secondary characteristic curve (P2C) and the target pressure (Po). Thus, the secondary pressure (P2) is maintained at the target pressure (Po). From this state, for example, when the consumption of water in houses and other buildings becomes almost zero and the secondary pressure (P2) sharply rises, the water turbine operating point moves from position a to position b as illustrated in FIG. 10B.

Suppose the control via the motor-operated valve and the control via the generator are performed in parallel to reduce the secondary pressure (P2). The pressure control by means of the generator (12) has higher responsiveness than the pressure control by means of the motor-operated valve (15). Thus, the control via the generator reduces the torque of the generator (12), and the water turbine operating point moves from position b to position f. In the state shown in FIG. 10C, the water turbine operating point is at position f on the intersection between the secondary characteristic curve (P2C) and the runaway curve (RC). The generator (12), at a torque of zero, cannot reduce the secondary pressure (P2) any more while operating in the regenerative mode.

Figure 10D:
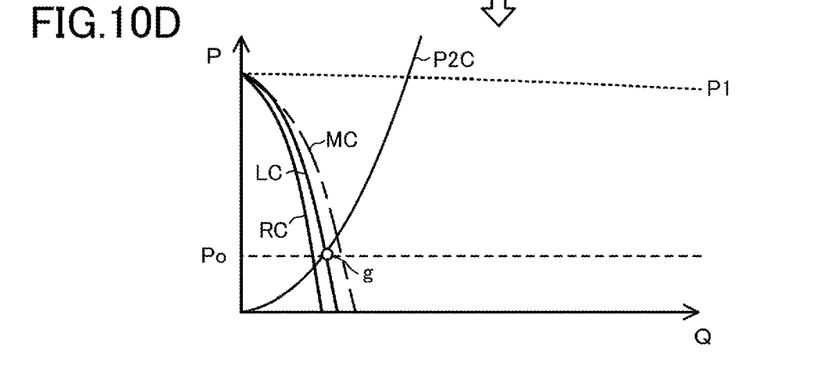

The opening degree of the motor-operated valve (15) gradually decreases with a delay from the control of the generator (12). As a result, the water turbine operating point moves from position f to position g as illustrated in FIG. 10D, and the secondary pressure (P2) converges to the target pressure (Po). While the water turbine operating point moves from the position in FIG. 10C to the position in FIG. 10D, it takes about 20 seconds to 30 seconds, for example, for the opening degree of the motor-operated valve (15) to converge to the target opening degree. Thus, the pressure control according to the comparative example also has the concern that the demand of the water supply system (1) cannot be satisfied due to the delay of the response of the motor-operated valve (15).

Pressure Control According to Present Embodiment

In consideration of the above concern, the present embodiment executes the second control for regulating the secondary pressure (P2) in parallel with the power running operation, in addition to the first control for regulating the secondary pressure (P2) in parallel with the regenerative operation. The pressure control according to this embodiment will be described in detail with reference to FIGS. 3 and 6 to 8. The pressure control according to this embodiment executes the control via the generator and the control via the motor-operated valve, which will be described later, in the same period. Both controls will be described in detail below.

Control Via Generator

Figure 6:
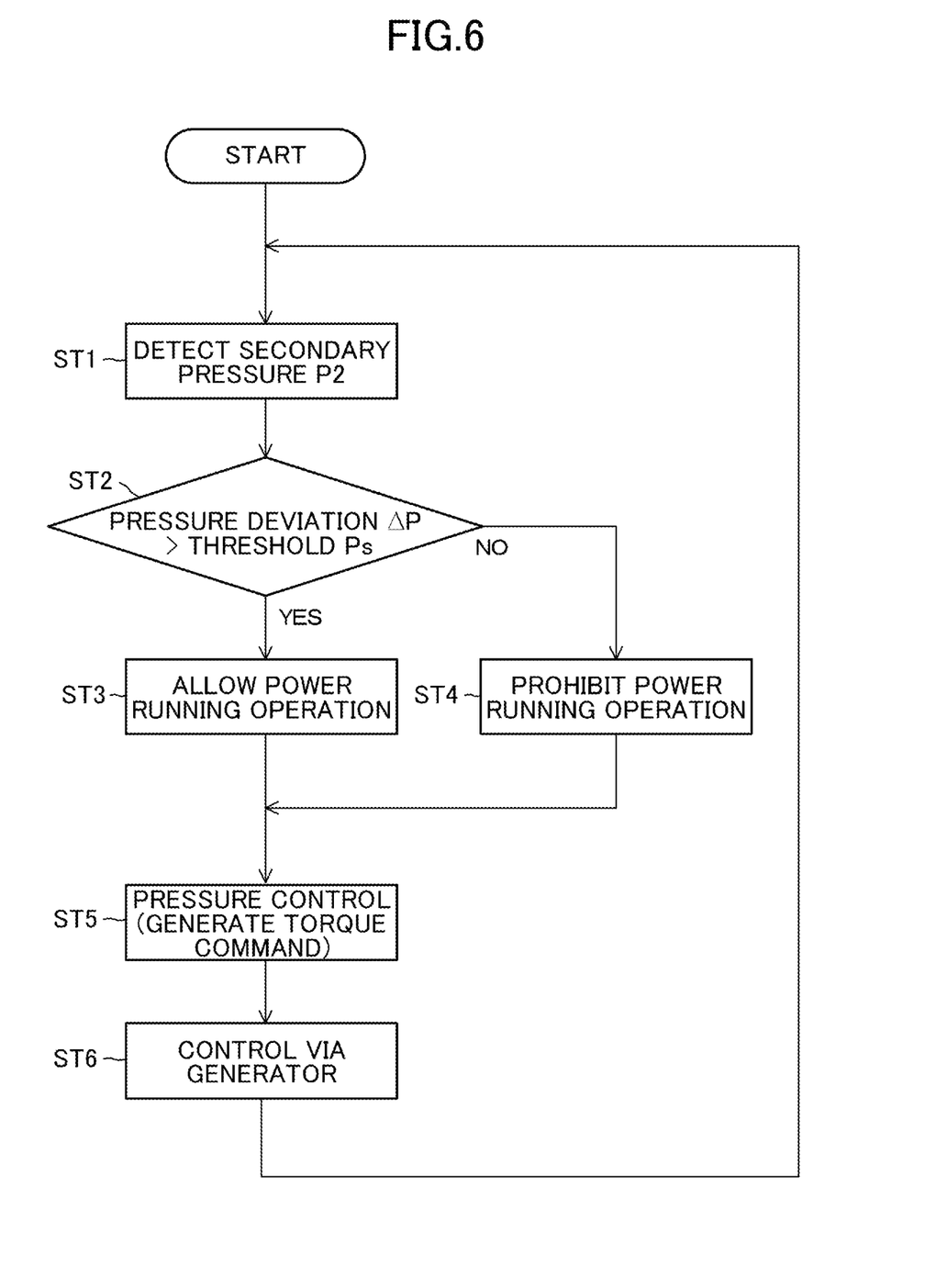
FIG. 6 is a flowchart of control via a generator.

FIG. 6 is a flowchart of the control via the generator according to the present embodiment. In Step ST1, the pressure sensor (20) detects the secondary pressure (P2). In Step ST2, a pressure deviation ($\Delta P$) and a threshold (Ps) are compared. The pressure deviation ($\Delta P$) is a difference between the detected secondary pressure (P2) and the target pressure (Po) ($\Delta P = P2 - Po$). If the pressure deviation ($\Delta P$) exceeds the threshold (Ps) in Step ST2, the process proceeds to Step ST3. If the pressure deviation ($\Delta P$) is equal to or less than the threshold (Ps) in Step ST2, the process proceeds to Step ST4.

In Step ST3, a flag that permits the power running operation is set. If the power running operation is permitted, the lower limit of the range of regulation of the secondary pressure (P2) can be lowered. This allows the secondary pressure (P2) to converge to the target pressure (Po) if the pressure deviation ($\Delta P$) exceeds the threshold (Ps).

In Step ST4, a flag that prohibits the power running operation is set. If the pressure deviation ($\Delta P$) is equal to or less than the threshold (Ps), the secondary pressure (P2) can converge to the target pressure (Po) only by the regenerative operation.

In Step ST5, the pressure control unit (35) generates a torque command value. As mentioned above, the torque command value corresponds to the torque of the generator (12) for converging the secondary pressure (P2) to the target pressure (Po). If the flag that prohibits the power running operation has been set in Step ST5, the torque command value is limited to a range from the torque shown in FIG. 3 (T=0) to a predetermined negative torque value. In other words, the torque command value is limited to a range where the generator (12) operates in the regenerative mode only.

If the flag that permits the power running operation is set in Step ST5, the torque command value is generated in a range from a predetermined positive torque value to a predetermined negative torque value shown in FIG. 3. In other words, the range of the torque command value includes a region where the generator (12) operates in the regenerative mode, i.e., the water turbine region, and a region where the generator (12) operates in the power running mode, i.e., the water turbine brake region or the power running region.

If the flag that permits the power running operation is set in Step ST5, an upper limit is preferably set to the positive torque command value so that, in a strict sense, the water turbine operating point does not reach a reverse pump region. The reverse pump region is a region in which the flow rate (Q) becomes negative along with the rotation of the water turbine (11) due to an excessive increase in the positive torque when the generator (12) operates in the power running mode. If the water turbine operating point reaches the reverse pump region, water flows backward with respect to the forward direction of the water flow in the water turbine (11). Thus, in the second control permitting the power running operation, the generator (12) is preferably controlled to allow the fluid to flow in the forward direction in the water turbine (11) while operating in the power running mode. The "forward direction" is a direction in which water flows from the upstream to the downstream in the flow path (4) in a normal state.

If the torque command value is generated in Step ST5, the process proceeds to Step ST6. In Step ST6, the torque of the generator (12) converges to the torque command value, and in turn, the secondary pressure (P2) converges to the target pressure (Po).

As will be described in detail later, if the power running operation is prohibited, only the first control of regulating the secondary pressure (P2) is performed while allowing the generator (12) to operate in the regenerative mode. If the power running operation is permitted, the first control of regulating the secondary pressure (P2) while allowing the generator (12) to operate in the regenerative mode, and the second control of regulating the secondary pressure (P2) while allowing the generator (12) to operate in the power running mode are executed.

Control Via Motor-Operated Valve

Figure 7:
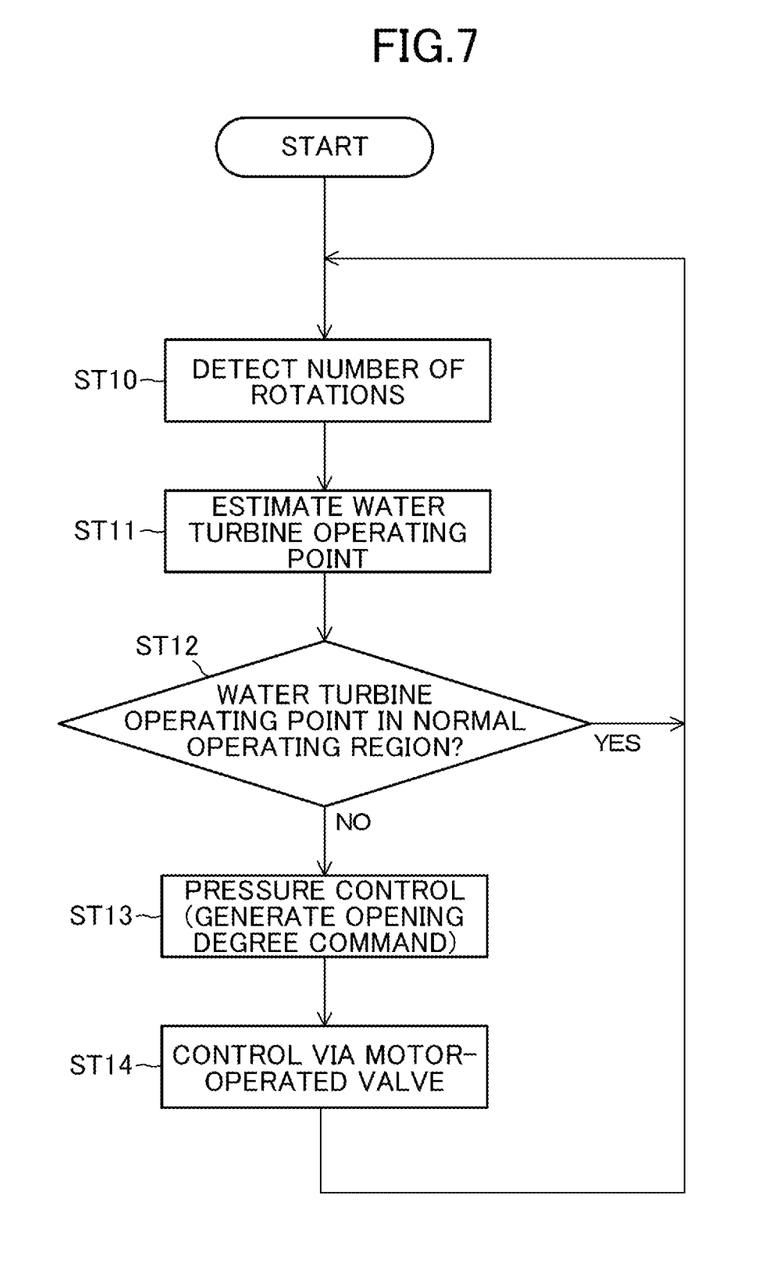
FIG. 7 is a flowchart of control via a motor-operated valve.

FIG. 7 is a flowchart of the control via the motor-operated valve according to the present embodiment. In Step ST10, the rotation speed detector (32) detects the number of rotations of the generator (12). In Step ST11, the water turbine operating point estimator (33) estimates the current water turbine operating point. The water turbine operating point estimator (33) calculates, in accordance with the data related to the characteristic map shown in FIG. 3, for example, the water turbine operating point from the number of rotations (N) and torque (T) of the generator (12). The torque command value generated by the pressure control unit (35) is used as an index corresponding to the torque (T). The water turbine operating point estimator (33) can obtain the water turbine operating point by, for example, measuring the flow rate (Q) of the water turbine (11) or measuring the power generated by the generator (12).

In Step ST12, whether the water turbine operating point obtained in Step ST11 is within the normal operating region is determined. The pressure control unit (35) makes the determination. As described above, the normal operating region lies between the cavitation curve (CC) and the water turbine limit curve (LC). If the water turbine operating point is determined to be in the normal operating region in Step ST12, no pressure control via the motor-operated valve (15) is performed.

If the water turbine operating point is determined to be out of the normal operating region in Step ST12, the process proceeds to Step ST13. In Step ST13, the pressure control unit (35) generates an opening degree command value. As described above, the opening degree command value corresponds to the opening degree of the motor-operated valve (15) for converging the water turbine operating point to the normal operating region.

If the opening degree command value is generated in Step ST13, the process proceeds to Step ST14. In Step ST14, the opening degree of the motor-operated valve (15) converges to the opening degree command value.

Specific Example 1 of Pressure Control (Power Running Operation Prohibited)

FIGS. 8A to 8D are graphs each showing a specific example of a pressure control, in which the power running operation is prohibited.

Figure 8A:
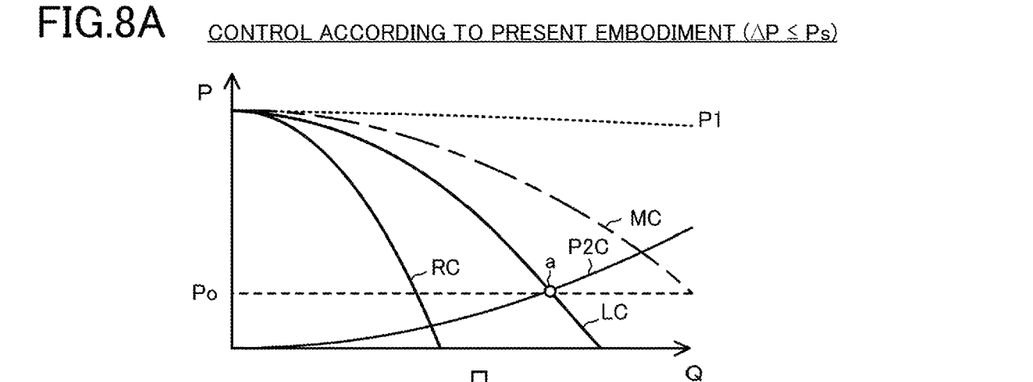
FIGS. 8A to 8D are graphs each showing a specific example of pressure control according to the embodiment, in which no power running operation is allowed.
Figure 8B:
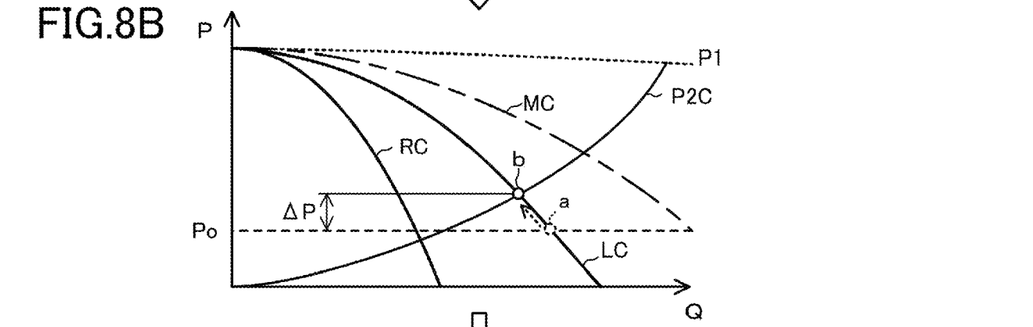

When the secondary pressure (P2) increases as illustrated in FIGS. 8A and 8B, the water turbine operating point moves from position a to position b. In this example, the amount of increase of the secondary pressure (P2) is relatively small, and the pressure deviation (ΔP) is equal to or less than the threshold (Ps). In this case, the process proceeds to Step ST4 in FIG. 6, and the power running operation is prohibited. Therefore, in the control via the generator, the torque command value is generated in a range from zero to a predetermined negative torque value.

Figure 8C:
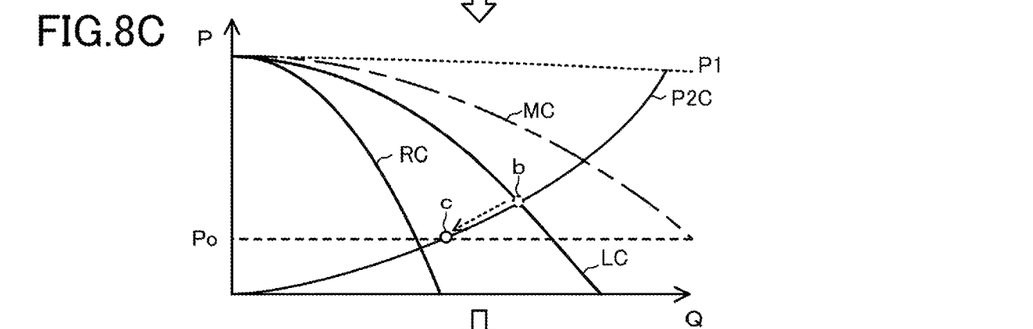

The pressure regulation by means of the generator (12) has higher responsiveness than the pressure regulation by means of the motor-operated valve (15). Thus, once the control via the generator is executed, the negative torque rapidly drops, and the secondary pressure (P2) decreases. As illustrated in FIG. 8C, when the water turbine operating point moves to position c, the secondary pressure (P2) converges to the target pressure (Po). In this example, the pressure deviation (ΔP) is relatively small. This allows the secondary pressure (P2) to converge to the target pressure (Po) in the water turbine region where the regenerative operation is performed.

Figure 8D:
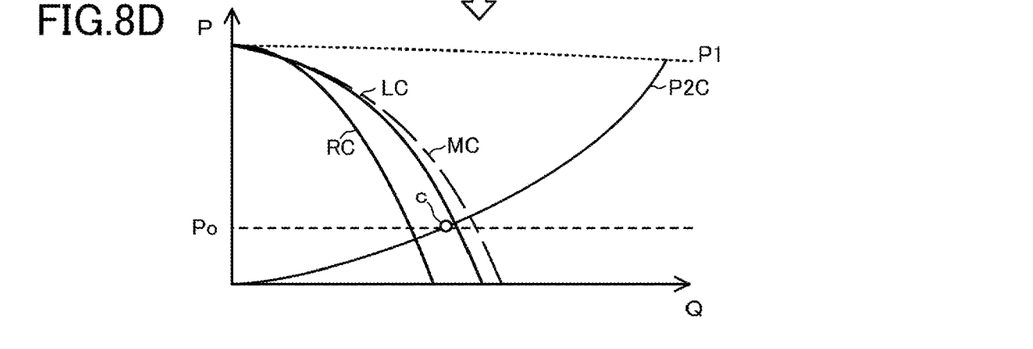

In the state shown in FIG. 8C, the water turbine operating point is greatly separated from the water turbine limit curve (LC), i.e., deviating from the normal operating region. This may cause the cavitation. In this case, the water turbine operating point is determined to be out of the normal operating region in Step ST12 in FIG. 7, and the process proceeds to Step ST13. Thus, the opening degree of the motor-operated valve (15) decreases, and the amount of pressure reduction by the motor-operated valve (15) increases. Then, the motor-operated valve curve (MC), the water turbine limit curve (LC), and the runaway curve (RC) become steeper, and the water turbine operating point approaches the water turbine limit curve (LC). The control of the opening degree of the motor-operated valve (15) continues until the water turbine operating point reaches the normal operating region. As a result, the water turbine operating point at position c reaches the normal operating region as illustrated in FIG. 8D. This can block the cavitation from occurring.

Specific Example 2 of Pressure Control (Power Running Operation Allowed)

FIGS. 9A to 9D are graphs each showing a specific example of a pressure control, in which the power running operation is allowed.

Figure 9A:
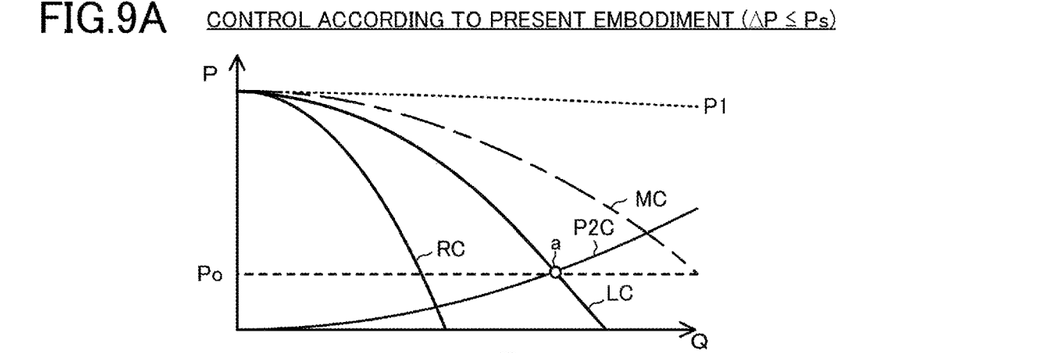
FIGS. 9A to 9D are graphs each showing a specific example of pressure control according to the embodiment, in which a power running operation is allowed.
Figure 9B:
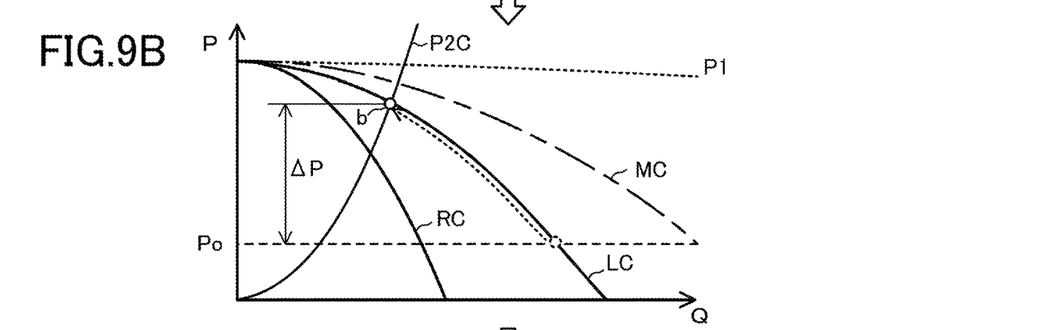

When the secondary pressure (P2) increases as illustrated in FIGS. 9A and 9B, the water turbine operating point moves from position a to position b. In this example, the amount of increase of the secondary pressure (P2) is relatively large, and the pressure deviation (ΔP) is greater than the threshold (Ps). In this case, the process proceeds to Step ST3 in FIG. 6, and the power running operation is allowed. Thus, in the control via the generator, the torque command value is generated in a range from a predetermined positive torque value to a predetermined negative torque value.

The pressure regulation by means of the generator (12) has higher responsiveness than the pressure regulation by means of the motor-operated valve (15). Thus, once the control via the generator is executed, the negative torque rapidly drops, and the secondary pressure (P2) decreases.

Figure 9C:
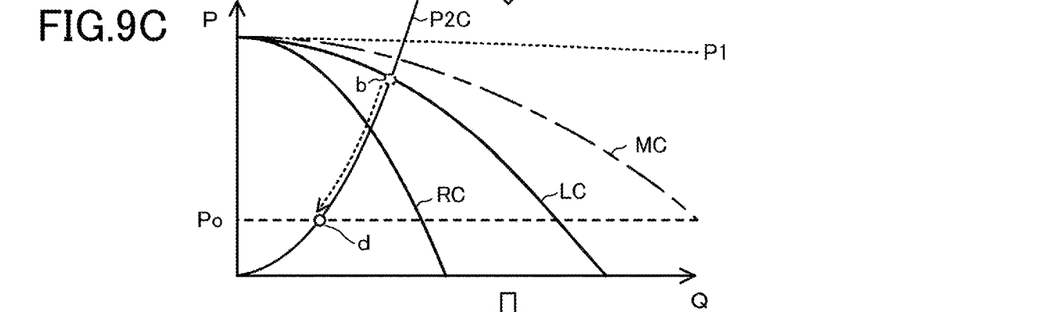

In this example, the pressure deviation (ΔP) is relatively large. Thus, the secondary pressure (P2) fails to converge to the target pressure (Po) only in the water turbine region where the regenerative operation is performed. In this case, the positive torque increases in the power running region, further reducing the secondary pressure (P2). In the state of FIG. 9C, the water turbine operating point moves to position d, and the secondary pressure (P2) converges to the target pressure (Po). The water turbine operating point at position d is in the power running region.

As can be seen in the foregoing, in the present embodiment, the secondary pressure (P2) is reduced by means of the power running region under the condition where the pressure deviation (ΔP) is relatively large. This allows the relatively high secondary pressure (P2) to quickly converge to the target pressure (Po), satisfying the demand of the water supply system (1).

Figure 9D:
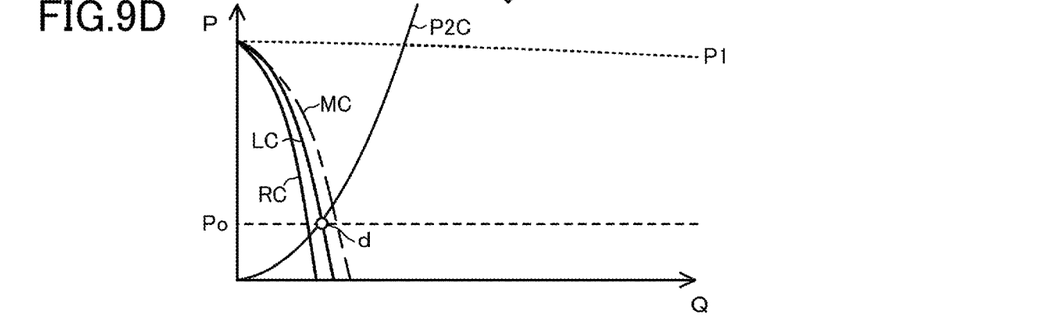

In the state shown in FIG. 9C, the water turbine operating point is greatly separated from the water turbine limit curve (LC), i.e., deviating from the normal operating region. This may cause the cavitation. In this case, the water turbine operating point is determined to be out of the normal operating region in Step ST12 in FIG. 7, and the process proceeds to Step ST13. Thus, the opening degree of the motor-operated valve (15) decreases, and the amount of pressure reduction by the motor-operated valve (15) increases. Then, the motor-operated valve curve (MC), the water turbine limit curve (LC), and the runaway curve (RC) become steeper, and the water turbine operating point approaches the water turbine limit curve (LC). The control of the opening degree of the motor-operated valve (15) continues until the water turbine operating point reaches the normal operating region. As a result, the water turbine operating point at position d reaches the normal operating region as illustrated in FIG. 9D. This can block the cavitation from occurring.

Advantages of Embodiment

The hydroelectric power generation system of the present embodiment includes: a water turbine (11) arranged in a flow path (4) through which a fluid flows; a generator (12) connected to the water turbine (11); and a controller (30) that performs pressure control by controlling the generator (12) to regulate a pressure of the fluid downstream of the water turbine (11), i.e., a secondary pressure (P2). The pressure control includes a first control of regulating the pressure in parallel with a regenerative operation of the generator (12), and a second control of regulating the pressure in parallel with a power running operation of the generator (12).

This configuration can expand the range of pressure regulation by means of the generator (12).

The motor-operated valve (15) of the present embodiment is arranged in series with the water turbine (11) in the flow path (4).

In this configuration, control of the opening degree of the motor-operated valve (15), in addition to the control of the generator (12), can regulate the secondary pressure (P2) in a wider range.

The controller (30) of the present embodiment performs the pressure control by controlling the generator (12) to bring the secondary pressure (P2) close to the target pressure (Po).

In this configuration, the secondary pressure (P2), if greatly increased with respect to the target pressure (Po), can quickly and reliably converge to the target pressure (Po) by means of the power running region.

The controller (30) of the present embodiment performs the pressure control by controlling the motor-operated valve (15) so that the water turbine operating point converges to a normal operating region.

In this configuration, the opening degree of the motor-operated valve (15) is regulated when the water turbine operating point deviates from the normal operating region. This allows the secondary pressure (P2) to quickly converge to the target pressure (Po), and can block the cavitation to occur.

In the present embodiment, the pressure regulation by means of the generator (12) has higher responsiveness than the pressure regulation by means of the motor-operated valve (15). Thus, the control via the generator having higher responsiveness and a wider range of pressure regulation allows the secondary pressure (P2) to quickly converge to the target pressure (Po). The motor-operated valve (15) having lower responsiveness can then supplementarily regulate the secondary pressure (P2), and can block the cavitation from occurring.

The present embodiment permits the second control in which the power running operation is performed if the difference between the secondary pressure (P2) and the target pressure (Po), i.e., a pressure deviation (ΔP), is greater than the threshold (Ps). This allows the secondary pressure (P2), which is relatively high, to quickly converge to the target pressure (Po). The present embodiment prohibits the second control in which the power running operation is performed if the pressure deviation (ΔP) is equal to or less than the threshold (Ps). Thus, the secondary pressure (P2), which is relatively low, can converge to the target pressure (Po) only through the regenerative operation. In this case, the generator (12) can continue the power generation.

Variation of Embodiment

Figure 11:
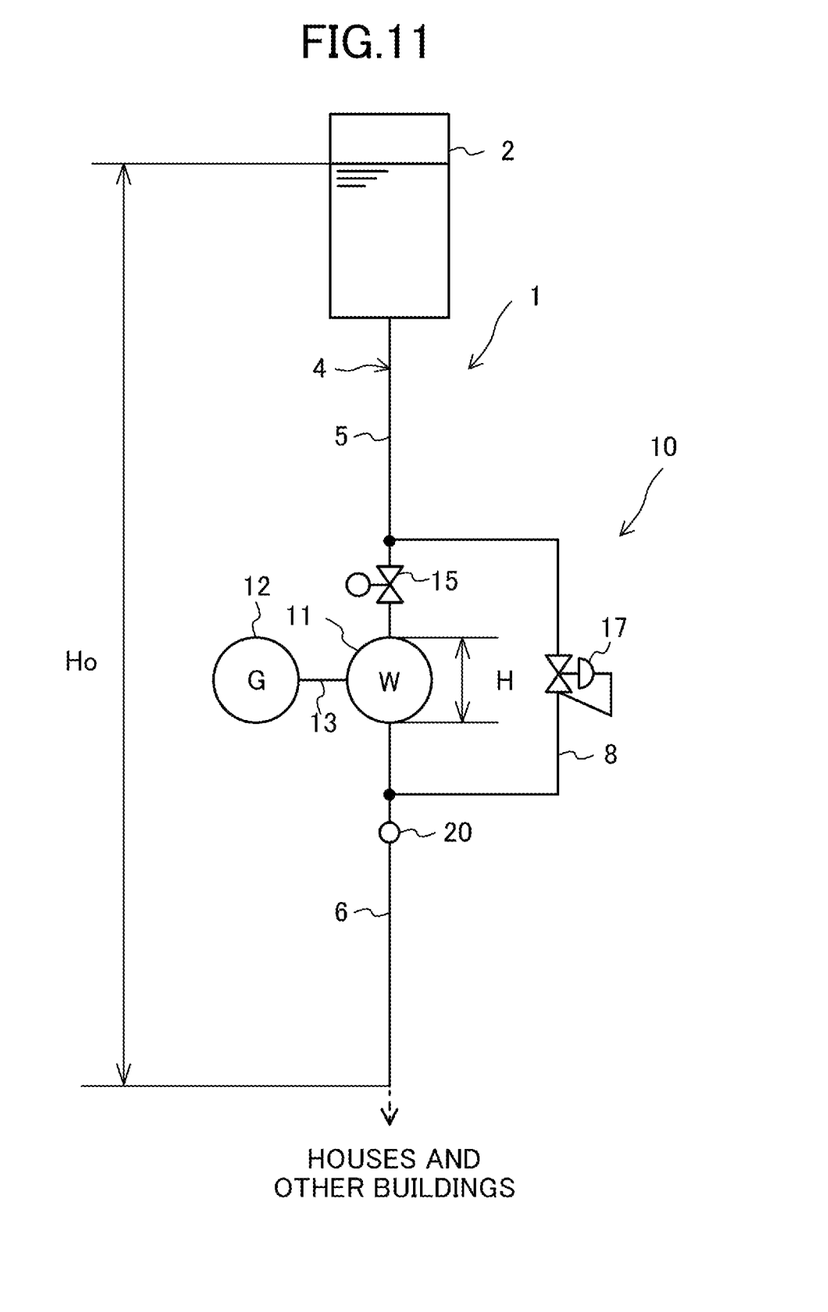
FIG. 11 is a schematic configuration diagram illustrating a hydroelectric power generation system and a water supply system according to a variation of the embodiment.

A hydroelectric power generation system (10) according to a variation shown in FIG. 11 includes a bypass channel (8) and a decompression valve (16). The bypass channel (8) bypasses the motor-operated valve (15) and the water turbine (11). The bypass channel (8) has an inlet end connected to the upstream of the motor-operated valve (15) in the first flow path (5). The bypass channel (8) has an outlet end connected to the upstream of the pressure sensor (20) in the second flow path (6).

The decompression valve (16) is arranged in the bypass channel (8). The decompression valve (16) regulates the opening degree to bring the pressure downstream of the water turbine (11), i.e., the secondary pressure (P2), to a predetermined value. When the secondary pressure (P2) downstream of the water turbine (11) falls below a first value, the decompression valve (16) is mechanically opened by a spring or any other element to increase the secondary pressure (P2). The first value is set lower than the target pressure (Po) of the secondary pressure (P2). Thus, the decompression valve (16) does not open in a normal operation in which the secondary pressure (P2) is kept at the target pressure (Po).

If the motor-operated valve (15) is closed due to a blackout or a breakdown, water cannot pass through the motor-operated valve (15), and no water is supplied to houses and other buildings. In this variation, the decompression valve (16) opens when the motor-operated valve (15) is closed and the secondary pressure (P2) is lowered. This allows water upstream of the motor-operated valve (15) to flow through the decompression valve (16) and the bypass channel (8). Thus, water is reliably supplied to the houses and other buildings if the motor-operated valve (15) is closed due to a blackout or a breakdown.

If the flow rate of water downstream of the water turbine (11) suddenly increases, the secondary pressure (P2) downstream of the water turbine (11) may rapidly drop. In this case, opening the decompression valve (16) can block such a rapid drop of the secondary pressure (P2).

Other Embodiments

The embodiment (and variation) described above may be modified in the following manner.

The flow path (4) through which the fluid flows may not be a pipeline, and may be, for example, a groove that opens upward. The flow path (4) may be applied to other facilities than the water supply system (1). The flow path (4) may have no water distribution tank (2), and may have a water storage tank in place of the water distribution tank (2). The fluid is not necessarily water, and may be brine used in, for example, an air conditioner.

In the control via the generator, the torque of the generator (12) is controlled to regulate the secondary pressure (P2). Alternatively, the number of rotations of the generator (12) may be controlled to regulate the secondary pressure (P2). Also in this case, the first control of regulating the secondary pressure (P2) in parallel with the regenerative operation and the second control of regulating the secondary pressure (P2) in parallel with the power running operation can be executed.

The AC/DC converter (31) may be configured as a matrix converter or a cycloconverter. The AC/DC converter (31) may be independent of the generator controller (30).

A commercial power source serving as the electric power system (60) may be replaced with a rechargeable battery. The rechargeable battery stores power generated by the generator (12) in the regenerative operation. Power supplied from the rechargeable battery to the generator allows the generator (12) to operate in the power running mode.

The present disclosure is useful as a hydroelectric power generation system.

The invention claimed is:

1. A hydroelectric power generation system comprising:
   a water turbine arranged in a flow path through which a fluid flows;
   a generator connected to the water turbine; and
   a controller configured to perform a pressure control by controlling the generator to regulate a pressure of the fluid downstream of the water turbine, the pressure control including
   a first control regulating the pressure in parallel with a regenerative operation of the generator, and
   a second control regulating the pressure in parallel with a power running operation of the generator.

2. The hydroelectric power generation system of claim 1, wherein
   the controller is configured to perform the pressure control by controlling the generator so that the pressure of the fluid downstream of the water turbine converges to a target pressure.

3. The hydroelectric power generation system of claim 2, further comprising:
   a motor-operated valve arranged in series with the water turbine in the flow path.

4. The hydroelectric power generation system of claim 3, wherein
   the controller is configured to perform the pressure control by controlling the motor-operated valve so that an operating point of the water turbine converges to a normal operating region.

5. The hydroelectric power generation system of claim 1, further comprising:
   a motor-operated valve arranged in series with the water turbine in the flow path.

6. The hydroelectric power generation system of claim 5, wherein
   the controller is configured to perform the pressure control by controlling the motor-operated valve so that an operating point of the water turbine converges to a normal operating region.

7. The hydroelectric power generation system of claim 6, wherein
   pressure regulation using the generator has higher responsiveness than pressure regulation using the motor-operated valve.

8. The hydroelectric power generation system of claim 6, further comprising:
   a bypass channel that bypasses the water turbine and the motor-operated valve; and
   a decompression valve arranged in the bypass channel, the decompression valve regulating an opening degree to bring the pressure to a predetermined value.

9. The hydroelectric power generation system of claim 5, wherein
   pressure regulation using the generator has higher responsiveness than pressure regulation using the motor-operated valve.

10. The hydroelectric power generation system of claim 9, further comprising:
    a bypass channel that bypasses the water turbine and the motor-operated valve; and
    a decompression valve arranged in the bypass channel, the decompression valve regulating an opening degree to bring the pressure to a predetermined value.

11. The hydroelectric power generation system of claim 5, further comprising:
    a bypass channel that bypasses the water turbine and the motor-operated valve; and
    a decompression valve arranged in the bypass channel, the decompression valve regulating an opening degree to bring the pressure to a predetermined value.

* * * * *